(12) United States Patent
Adams, III et al.

(10) Patent No.: US 10,219,223 B2
(45) Date of Patent: Feb. 26, 2019

(54) CONCURRENT MODE RADIO (71) Applicant: GainSpan Corporation, San Jose, CA (US)

(72) Inventors: Lewis E. Adams, III, San Jose, CA (US); Pankaj Vyas, San Jose, CA (US); Alan J. Herring, San Jose, CA (US); Gregory Winner, San Jose, CA (US)

(73) Assignee: GainSpan Corporation, San Jose, CA (US)

( * ) Notice: Subject to any disclaimer, the term of this patent is extended or adjusted under 35 U.S.C. 154(b) by 93 days.

(21) Appl. No.: 14/676,762

(22) Filed: Apr. 1, 2015

(65) Prior Publication Data

US 2016/0242222 A1   Aug. 18, 2016

Related U.S. Application Data

(60) Provisional application No. 62/117,660, filed on Feb. 18, 2015.

(51) Int. Cl.
| | | |
|---|---|---|
| *H04W 52/02* | (2009.01) | |
| *H04W 76/16* | (2018.01) | |
| *H04W 4/80* | (2018.01) | |
| *H04W 48/18* | (2009.01) | |
| *H04W 88/06* | (2009.01) | |
| *H04W 84/12* | (2009.01) | |
| *H04W 84/18* | (2009.01) | |

(52) U.S. Cl.
CPC ......... *H04W 52/0261* (2013.01); *H04W 4/80* (2018.02); *H04W 76/16* (2018.02); *H04W 48/18* (2013.01); *H04W 84/12* (2013.01); *H04W 84/18* (2013.01); *H04W 88/06* (2013.01); *Y02D 70/00* (2018.01); *Y02D 70/142* (2018.01); *Y02D 70/144* (2018.01); *Y02D 70/162* (2018.01)

(58) Field of Classification Search
CPC . H04W 4/008; H04W 48/18; H04W 52/0261; H04W 76/025
See application file for complete search history.

(56) References Cited

U.S. PATENT DOCUMENTS

| | | | | |
|---|---|---|---|---|
| 9,544,853 B1* | 1/2017 | Gu | ..................... | H04W 52/0261 |
| 2002/0085520 A1* | 7/2002 | Sydon | ................... | H04M 1/725 |
| | | | | 370/335 |
| 2003/0016737 A1* | 1/2003 | Wu | ...................... | H04B 1/7103 |
| | | | | 375/224 |
| 2005/0080923 A1* | 4/2005 | Elzur | ..................... | H04L 47/10 |
| | | | | 709/238 |
| 2005/0153736 A1* | 7/2005 | Ganton | ............. | H04W 36/0083 |
| | | | | 455/553.1 |

(Continued)

*Primary Examiner* — Edan Orgad
*Assistant Examiner* — Nourali Mansoury
(74) *Attorney, Agent, or Firm* — Pearl Cohen Zedek Latzer Baratz LLP (57) ABSTRACT

A system includes a device and a wireless network. The device uses multiple wireless communication protocols. The wireless network is coupled to the device by the multiple wireless communication protocols. The device simultaneously uses two of more of the multiple wireless communication protocols. The wireless communication protocols and the wireless communication export protocols include WiFi, ZigBee and Bluetooth.

18 Claims, 6 Drawing Sheets

(56) References Cited

U.S. PATENT DOCUMENTS

| | | | |
|---|---|---|---|
| 2005/0190747 A1* | 9/2005 | Sindhwani | H04W 88/06 370/352 |
| 2006/0031934 A1* | 2/2006 | Kriegel | G06F 11/2294 726/22 |
| 2006/0095548 A1* | 5/2006 | Rabot | H04L 12/5692 709/220 |
| 2007/0046261 A1* | 3/2007 | Porebski | G01R 31/3641 320/132 |
| 2007/0049276 A1* | 3/2007 | Rimoni | H04W 36/30 455/436 |
| 2008/0057894 A1* | 3/2008 | Aleksic | H02J 9/002 455/187.1 |
| 2009/0201909 A1* | 8/2009 | Bou-Diab | H04L 45/00 370/351 |
| 2010/0154023 A1* | 6/2010 | Dey | H04N 21/41407 725/151 |
| 2010/0195539 A1* | 8/2010 | Tian | H04L 47/824 370/255 |
| 2011/0009161 A1* | 1/2011 | Trikha | H04B 1/1036 455/552.1 |
| 2011/0142059 A1* | 6/2011 | Bedingfield, Sr. | H04L 12/2818 370/401 |
| 2012/0077433 A1* | 3/2012 | Walker | H04M 1/7253 455/41.1 |
| 2012/0258707 A1* | 10/2012 | Mathias | H04W 36/30 455/426.1 |
| 2013/0176322 A1* | 7/2013 | Bakalash | G06T 15/005 345/522 |
| 2014/0064275 A1* | 3/2014 | Hammer | H04L 45/74 370/392 |
| 2014/0075220 A1* | 3/2014 | Song | H04W 52/0277 713/320 |
| 2014/0344062 A1* | 11/2014 | Lamont | G06Q 30/0267 705/14.64 |
| 2015/0369505 A1* | 12/2015 | Malve | H04W 4/008 700/276 |

* cited by examiner

CONCURRENT MODE RADIO

CROSS REFERENCE TO RELATED APPLICATION

This application claims the benefit under 35 U.S.C. § 119(e) to U.S. Provisional Patent Application No. 62/117,660 entitled "CONCURRENT MODE RADIO" filed on Feb. 18, 2015 the disclosure of which is expressly incorporated herein by reference in its entirety.

TECHNICAL FIELD

The present disclosure generally relates to wireless systems. More specifically, the present disclosure relates to concurrent mode used radio systems.

BACKGROUND

For wireless systems or devices, it is desirable to improve data transfer rates while conserving power. Wireless communication protocols such as ZigBee, Bluetooth and WiFi (e.g., 80.211 WiFi) may be used for different applications. However, certain protocols such as ZigBee or Bluetooth are more suited for low bandwidth, close-range communications with devices that may not require a network, whereas other protocols such as WiFi may be better suited for high bandwidth, long-range communications with devices in a large and broad network.

Furthermore, some wireless communication protocols may consume more power in comparison to other wireless communication protocols. A given wireless communication protocol is ideally used when it communicates with a device within its target range. For instance, it is desirable to use ZigBee and Bluetooth for devices located at a closer range. Additionally, it is desirable to use WiFi for devices located farther away and/or devices that have specified an increased throughput. In addition, if a wireless communication protocol does not need to be turned on and/or does not have to send continuous messages, it is desirable to conserve power by turning off the wireless communication protocol when it is not in use.

Some conventional devices, such as remote controls, may send messages to a device to control the functionality of the device. For example, a remote control may be used to turn the device on or off. The conventional devices use wireless communication protocols to send and receive messages. However, the conventional devices may be left on for excessive periods of time. Furthermore, the conventional devices may not use wireless communication protocol that improve interactions with other devices. Therefore, it is desirable to manage the use of wireless devices to conserve power while improving communications via wireless communications.

SUMMARY

A communications system in accordance with an aspect of the present disclosure includes a device using multiple wireless communication protocols. Such a system further includes a wireless network coupled to the device by the multiple wireless communication protocols. The device concurrently uses two or more of the multiple wireless communication protocols simultaneously.

A method to communicate over wireless communication protocols in accordance with another aspect of the present disclosure includes concurrently receiving data on two or more wireless communication protocols. Such a method further includes performing actions based on the concurrently received data, and also includes transmitting data to a wireless network on two or more wireless communication protocols.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Aspects of the present disclosure are related to wireless systems that use a remote control to communicate with a device via a wireless communication protocol (such as ZigBee, Bluetooth, or WiFi). The wireless communication protocols may or may not use a wireless network. For example, some wireless communication protocols, such as ZigBee or Bluetooth, do not use a pre-established wireless network. Rather, the a first wireless device, such as a remote control, communicates with a second wireless device in a bidirectional or unidirectional fashion. For other wireless communication protocols, such as 802.11 WiFi, a pre-established wireless network is used so that a first wireless device, such as the remote control, can communicate with a second wireless device using long range communications. In the present application, wireless communication protocols may sometimes be referred to as wireless protocols.

In one configuration, information or messages can be sent from the remote control to the device via one or more wireless protocols. Still, in this configuration, a wireless protocol is selected according to various criteria. For example the wireless protocol may be determined based on a distance between the transmitter and the receivers and/or particular application. Furthermore, the wireless protocol is selected to reduce power use and improve the use of resources. In addition, the device may also use a number of different wireless communication protocols to communicate with a wireless network, other devices, a cloud, and/or other entities. The different wireless communication protocols may reinforce one another. That is, in case one wireless communication protocol fails or goes down, then another wireless communication protocol is there to take its place. Specifying multiple wireless communication protocols to serve as auxiliary or parallel channels to one another improves the robustness and reliability of the overall system.

Figure 1:
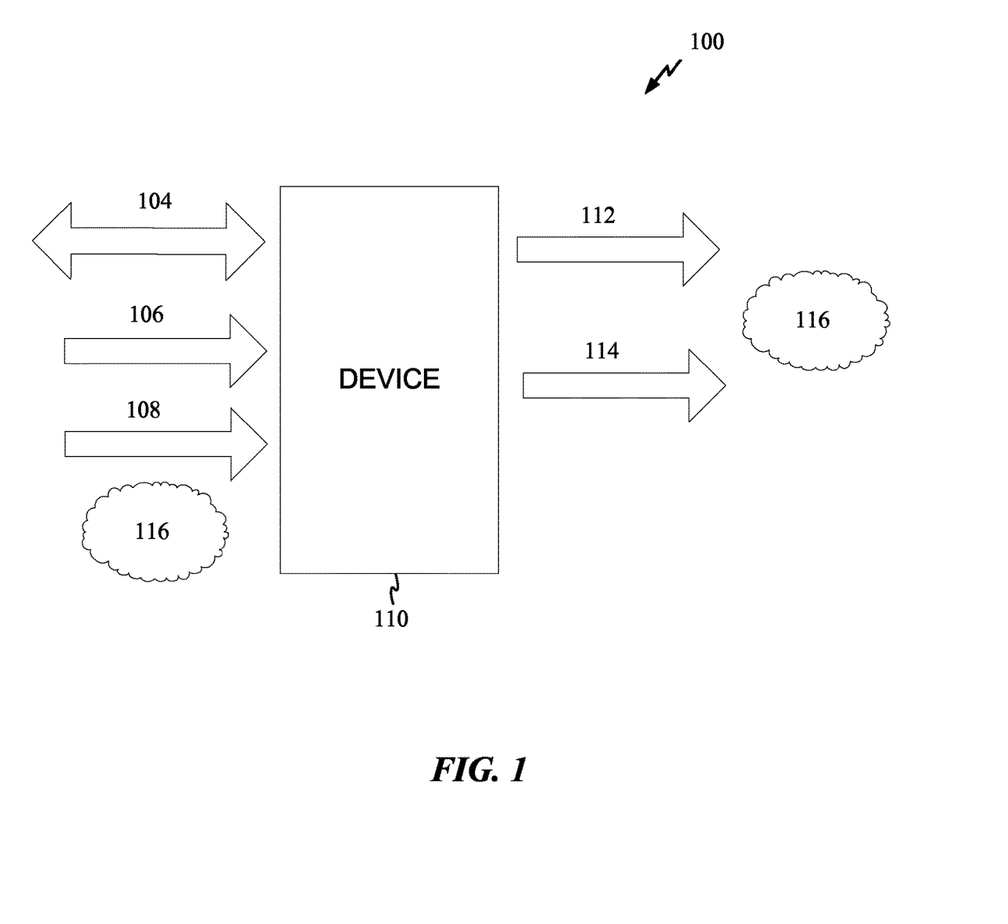
FIG. 1 is a schematic diagram of a device using various wireless communication protocols according to an aspect of the present disclosure.

FIG. 1 is a schematic diagram of a device 110 using various wireless communication protocols according to an aspect of the present disclosure.

Device 110 may receive information or messages via bidirectional close-range protocol 104, unidirectional close-range protocol 106, or long-range protocol 108. The long-range protocol 108 may also be assisted by wireless network 116, which may include other devices, such as remote controls, and/or connections to other devices.

An example of the bidirectional close-range protocol 104 is a ZigBee or Bluetooth connection because the bidirectional close-range protocol 104 only specifies the need for the device 110 and another device (not shown) in communications with one another. That is, the bidirectional close range protocol 104 does not use a wireless network for communications. This also means that the bidirectional close range protocol 104 uses less bandwidth, less power, and less resources in comparison to a conventional wireless network protocol connection. The bidirectional close range protocol 104 also does not have congestion or traffic because it is not on a conventional wireless network and may not be bound by frequency channels regulated by the FCC.

An example of the unidirectional close-range protocol 106 is ZigBee. For instance, the device 110 may be a smartphone and a store may be broadcasting an advertisement or similar message when the device 110 is within close proximity of the store such that the device 110 is also within the necessary range for ZigBee transmissions. The unidirectional close-range protocol 106 also does specify using a wireless network to communicate with the device 110. However, to receive messages, the device 110 should be close enough to the source broadcasting information via the unidirectional close-range protocol 106. The unidirectional close-range protocol 106 also has the advantages of less bandwidth, less power consumption, little to no congestion or traffic, and not being on a frequency channel regulated by the FCC.

An example of the long-range protocol 108 is a 802.11 WiFi connection. The long-range protocol 108 may use the wireless network 116. For instance, the device 110 may be a smartphone and a store located far away from the device 110 (but in the same mall where the device 110 is present) could be broadcasting an advertisement. By using the wireless network 116, the advertisement broadcasted by that store will reach the device 110 via the long-range protocol 108.

However, the long-range protocol 108 compared to the close-range protocols of 104 and 106 may use more power, more resources, more bandwidth, and have frequency channels that may be regulated by the FCC. As a result, there are restrictions and costs associated with bandwidth usage over a wireless network 116 via long-range protocol 108. Therefore, the long-range protocol 108 should be used in certain cases—such as for performing long-distance communications—in order to conserve resources and power.

The device 110 may also use long-range export protocol 112 and close-range export protocol 114 to communicate with the wireless network 116 or other devices, which may also be located in the wireless network 116. An example of the long-range export protocol 112 is 802.11 WiFi, as discussed above. The long-range export protocol 112 may both use the wireless network 116 as well as send information from the device 110 to the wireless network 116, or another device or receiver located within the wireless network 116.

An example of the close-range export protocol 114 is ZigBee. In this case, the ZigBee connection would not use the wireless network 116 due to the nature of a ZigBee connection. Still, the device 110 may communicate with another device within the wireless network 116 via the close-range export protocol 114. For example, the device 110 may be transmitting information to another smartphone or device. As another example, there may be a receiver in a store in the wireless network 116 that receives confirmation of user participation with regards to its advertisements.

Figure 2:
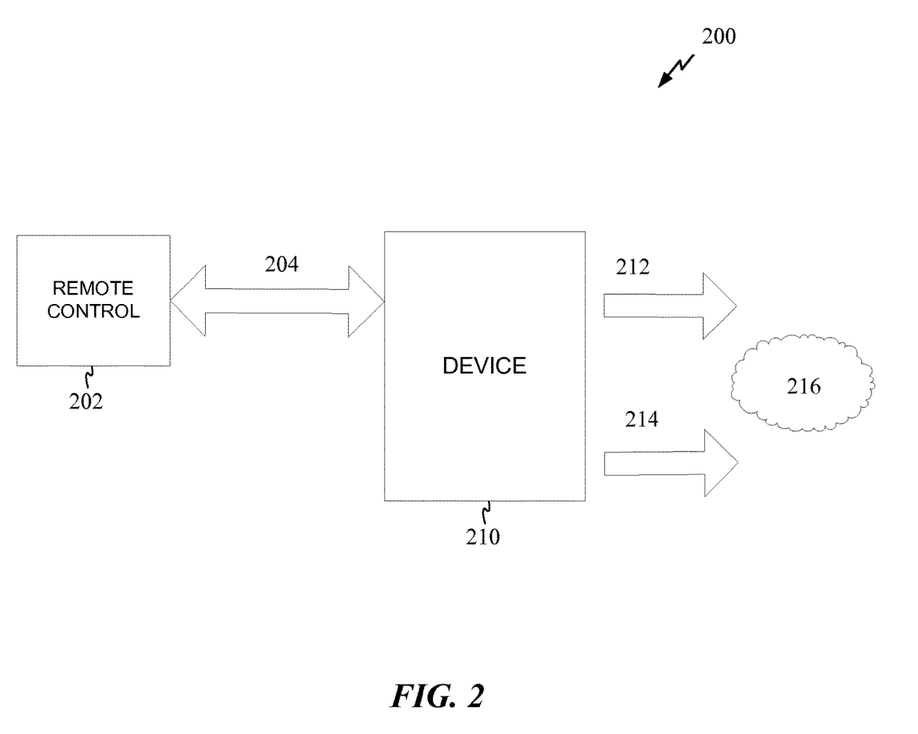
FIG. 2 is a schematic diagram of a device in communication with a remote control and using various wireless communication protocols according to an aspect of the present disclosure.

FIG. 2 is a schematic diagram 200 of a device 210 in communication with a remote control 202 and using various wireless communication protocols according to an aspect of the present disclosure.

The remote control 202 can send information and messages to device 210 via a bidirectional close-range protocol 204. An example of the bidirectional close-range protocol 204 is a ZigBee or Bluetooth connection. According to aspects of the present disclosure, the bidirectional close-range protocol 204 specifies that the remote control 202 and the device 210 directly communicate with one another. In other words, a wireless network is not necessary. Therefore, the communications between the remote control 202 and the device 210 may have an increased speed, reduced power, and reduced bandwidth in comparison to conventional communication protocols. Furthermore, FCC requirements or regulations may not be specified for the bidirectional close-range protocol 204.

Furthermore, resources may be used because the communications are made at a relatively close range. As an example, resources may be used if a device 210, such as a camera, and the remote control 202 were within a given proximity and also if the remote control 202 was configured to send the device 210 instructions such as turning on or off, and/or when to capture images. The bidirectional close-range protocol 204 may be specified to transmit a message via Zigbee from the remote control 202 to the device 210. Furthermore, the device 210 transmits an acknowledgment (ACK) message to the remote control 202 in response to receiving the message.

The device 210 may also use the long-range export protocol 212 and the close-range export protocol 214 to communicate with the wireless network 216 or other devices, which may also be located in the wireless network 216. An example of the long-range export protocol 212 is 802.11 WiFi. The long-range export protocol 212 may be used for communications between the wireless network 216 and the device 210. Additionally, the long-range export protocol 212 may be used for communications between the device 210 and another device located within the wireless network 216 (not shown in FIG. 2). An example of the close-range export protocol 214 is ZigBee. In this case, the close-range export protocol 214 connection may not need to use the wireless network 216 due to the nature of a the close-range export protocol 214 connection. Still, the device 210 may communicate or send information to another device or receiver within the wireless network 216 via the close-range export protocol 214. For instance, the device 210 may be a camera sending data to a computer. In another example, the device 210 may be a smartphone that sends information to another smartphone or device.

In an aspect of the present disclosure, the device 210 may use more than one of the protocols, e.g., the bidirectional close-range protocol 104, the unidirectional close-range protocol 106, the long-range protocol 108, and/or the wireless network 116, to communicate with the remote control 202 or with other devices, in a concurrent fashion. In other words, the device 210 may use multiple communications links at the same time, or at nearly the same time, to transmit and receive messages from other devices. The protocols being used in a concurrent manner may be selected based on power requirements, data rate requirements, message length, signal strength, and/or other factors.

Figure 3:
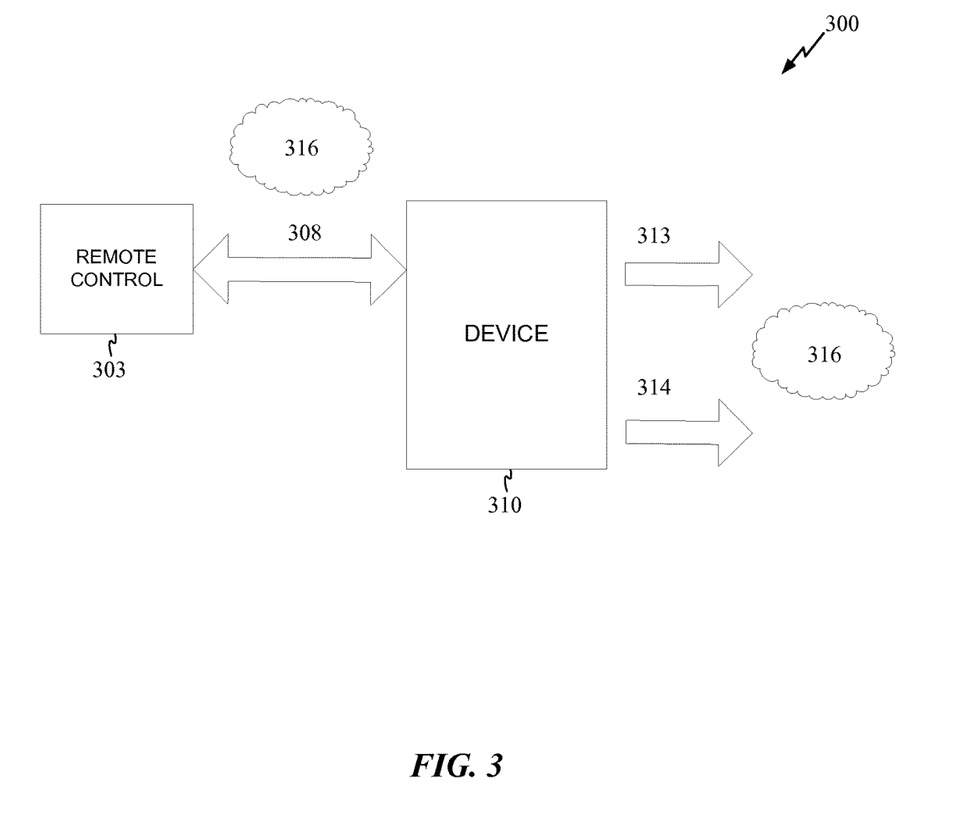
FIG. 3 is a schematic diagram of a device in communication with a remote control and using various wireless communication protocols according to an aspect of the present disclosure.

FIG. 3 is a schematic diagram 300 of a device 310 in communication with a remote control 303 and using various wireless communication protocols according to an aspect of the present disclosure.

The remote control 303 can send information and messages to device 310 via a bidirectional long-range protocol 308. An example of the bidirectional long-range protocol 308 is 802.11 WiFi. The bidirectional long-range protocol 308 would also use a wireless network 316. Communications with the bidirectional long-range protocol 308 over wireless network 316 may use increased bandwidth, power and resources. Still, it is desirable to use the bidirectional long-range protocol 308, rather than a short range protocol, for long range communications. Furthermore, the remote control 303 may access resources via the wireless network 316 that may not have been accessible via a short range protocol, such as ZigBee.

As an example, a device 310, such as a camera, may need to receive information, such as sunlight settings, from the remote control 303. In this example, the remote control 303 may access the wireless network 316 to retrieve the specified information. Therefore, it may be desirable to use a bidirectional long-range protocol 308 that has access to a wireless network 316. Likewise, in sending messages, such as ACK messages, from the device 310 to the remote control 303, the wireless network 316 can also be accessed in order to facilitate communications. For instance, the device 310, such as the a camera, may send information to the remote control 303. The information may include different turn-on/turn-off schedules. The information may be transmitted by the wireless network 316 via the bidirectional long-range protocol 308.

The device 310 also may use the long-range export protocol 313 and the close-range export protocol 314 to communicate with the wireless network 316 and/or other devices (not shown in FIG. 3) that may also be located in the wireless network 316. An example of the long-range export protocol 313 is 802.11 WiFi. An example of the close-range export protocol 314 is ZigBee.

Figure 4:
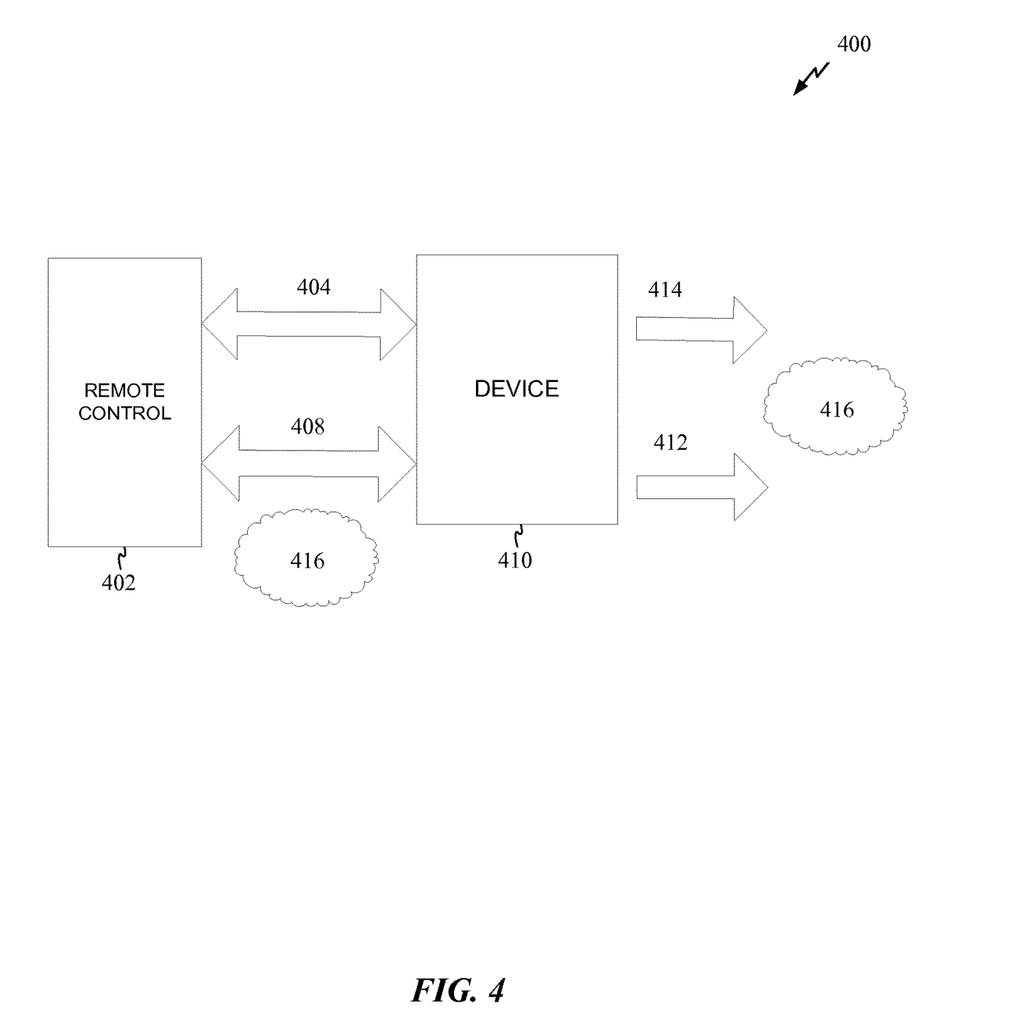
FIG. 4 is a schematic diagram of a device in communication with a remote control and using various wireless communication protocols according to an aspect of the present disclosure.

FIG. 4 is a schematic diagram 400 of a device 410 in communication with a remote control 402 according to an aspect of the present disclosure.

As shown in FIG. 4, the remote control 402, or other apparatus, may communicate with the device 410 via both a bidirectional close-range protocol 404 and a bidirectional long-range protocol 408. Both the bidirectional close-range protocol 404 and the bidirectional long-range protocol 408 are described above. In some cases, it may be desirable to simultaneously use and/or concurrently use both a bidirectional close-range protocol 404 and a bidirectional long-range protocol 408. Simultaneous transmissions may refer to messages transmitted by both protocols that use the same start and end same time. Further, concurrent transmissions may refer to messages transmitted by the protocols that do not start and/or end at the same time. Still, the messages may be transmitted at the same time over one or more wireless networks. Both simultaneous and concurrent transmission, as well as serial and/or other parallel transmission schemes, are within the scope of the present disclosure.

For example, if one of the protocols fails, another protocol may be used to transmit messages specified for the failed protocol. By using both the close-range and long-range channels as auxiliary or parallel channels, the information transfer between the remote control 402 and the device 410 is secured because of the increased redundancy of the network. Furthermore, information specified for a particular wireless communication protocol can be sent via a selected wireless communication protocol when appropriate. For example, if an increased amount of data is specified to be transmitted in a short amount of time, the bidirectional close-range protocol 404 may be used as the quickest form of transfer. Alternatively, if the amount of data is relatively small and can be sent over longer periods of time, then the bidirectional long-range protocol 408 may be used as the quickest form of transfer, with the wireless network 416 also being used to facilitate or further distribute the process.

The device 410 also may use the long-range export protocol 414 and the close-range export protocol 412 to communicate with the wireless network 416 or other devices (not shown in FIG. 4), which may also be located in the wireless network 416. An example of the long-range export protocol 414 is 802.11 WiFi. An example of the close-range export protocol 412 is ZigBee.

Figure 5:
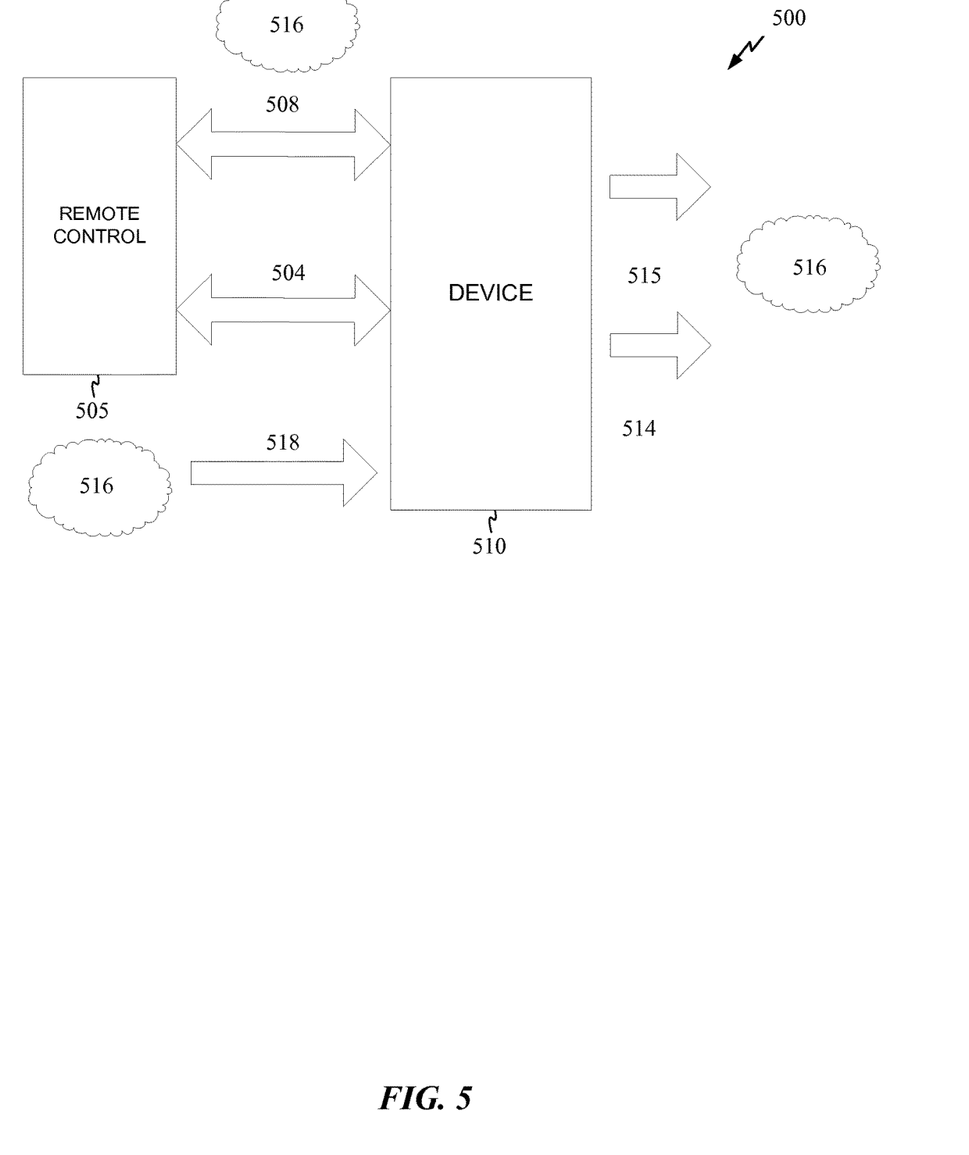
FIG. 5 is a schematic diagram of a device in communication with a remote control and using various wireless communication protocols according to an aspect of the present disclosure.

FIG. 5 is a schematic diagram 500 of a device 510 in communication with a remote control 505 according to an aspect of the present disclosure.

As shown in FIG. 5, the remote control 505 may communicate with the device 510 via a bidirectional close-range protocol 504, a bidirectional long-range protocol 508, and a long-range protocol 518. Both the bidirectional close-range protocol 504 and the bidirectional long-range protocol 508 are described above. The long-range protocol 518 may also be used for communications with devices via the long-range protocol 518. Examples of the long-range protocol 518 include 802.11 WiFi.

The device 510 may use the long-range export protocol 515 and the close-range export protocol 514 to communicate with the wireless network 516 or other devices (not shown in FIG. 5), which may also be located in the wireless network 516. An example of the long-range export protocol 515 is 802.11 WiFi. An example of the close-range export protocol 514 is ZigBee.

Aspects of the disclosure provide examples of using WiFi for the long range protocol. Of course, aspects of the present disclosure are not limited to WiFi and are also contemplated for other long range protocols. Additionally, aspects of the disclosure provide examples of using ZigBee for the close range protocol. Of course, aspects of the present disclosure are not limited to ZigBee and are also contemplated for other close range protocols. Furthermore, aspects of the disclosure provide examples of using a remote to communicate with a device. Of course, aspects of the present disclosure are not limited to remote and are also contemplated for other wireless devices.

Figure 6:
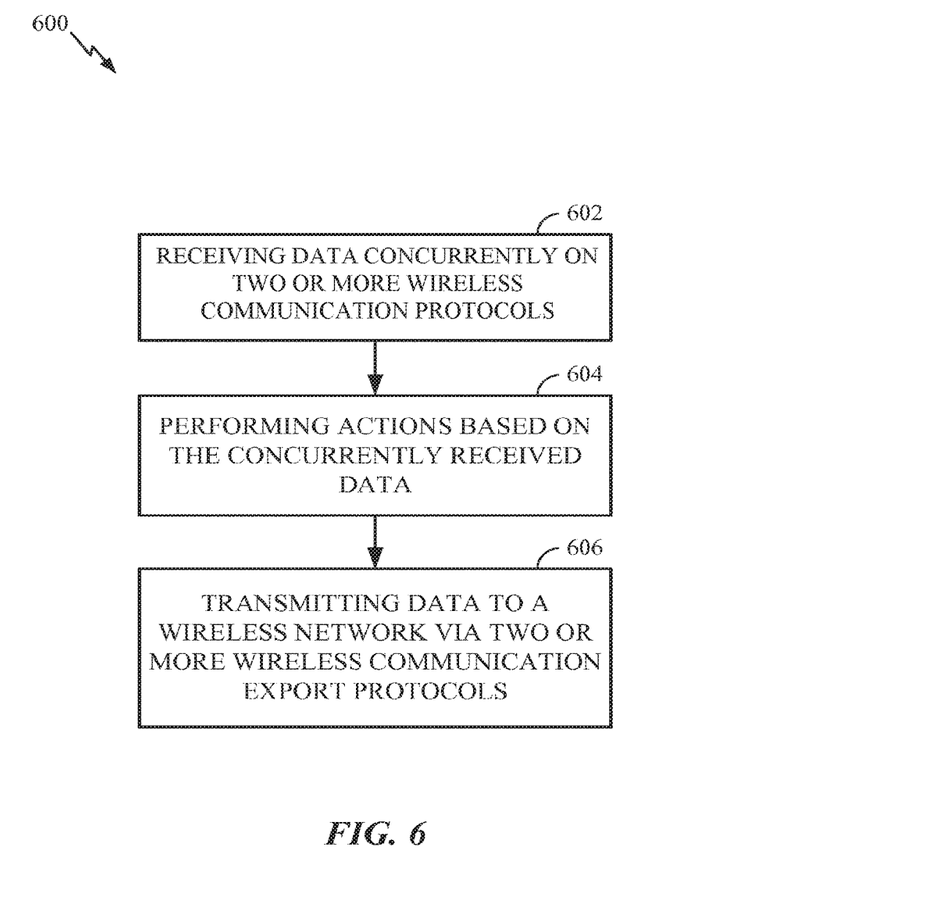
FIG. 6 is a process flow diagram illustrating a method of using a remote control to communicate with a device using various wireless communication protocols, according to an aspect of the present disclosure.

FIG. 6 is a process flow diagram illustrating a method 600 of using a remote control to communicate with a device using various wireless communication protocols, according to an aspect of the present disclosure.

In block 602, data is concurrently received on at least two wireless communication protocols. In block 604, actions are performed based on the concurrently received data. In block 606, data is transmitted to a wireless network on at least two wireless communication export protocols.

In one configuration each wireless communication protocol has a different physical layer address. Still, each wireless communication protocol may use the same upper layer address (i.e., network layer). Furthermore, the device may dynamically select between the wireless communication protocols. The selection may be based on a battery level of a device, communication needs, data size, and/or other needs. Moreover, the device may disable a wireless communication protocol when a power usage of the wireless communication protocol is greater than a threshold and the battery level of the device is less than a dynamic threshold. The dynamic threshold may be configured by an application that is running on the device.

Additionally, in one configuration, the device is configured with a preferred list of communication protocols. Accordingly, in this configuration, wireless communication protocols are selected based on the preferred list. For example, in some cases, Bluetooth may be preferred over Zigbee and WiFi may be preferred over another long range protocol. Thus, in this example, for short range communications, the device may first select Bluetooth and then select Zigbee.

Additionally, or alternatively, the device may broadcast a list of supported wireless communication protocols. Based on the broadcasted list, an apparatus can select one of the supported wireless communication protocols for communications with the device.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The foregoing description of one or more embodiments or aspects of the present disclosure has been presented for the purposes of illustration and description. It is not intended to be exhaustive or to limit the disclosure or the invention to the precise form disclosed. Many modifications and variations are possible in light of the above teaching. Although the present disclosure and invention has been described in connection with certain embodiments, it is to be understood that modifications and variations may be utilized without departing from the principles and scope of the disclosure or invention, as those skilled in the art will readily understand.

Accordingly, such modifications would be practiced within the scope of the disclosure and invention, and within the scope of the following claims or within the full range of equivalents of the claims.

Further, the attached claims are presented merely as one aspect of the present invention. No disclaimer is intended, expressed, or implied for any claim scope of the present invention through the inclusion of this or any other claim language that is presented herein or may be presented in the future. Any disclaimers, expressed or implied, made during prosecution of the present application regarding the claims presented, changes made to the claims for clarification, or other changes made during prosecution, are hereby expressly disclaimed for at least the reason of recapturing any potential disclaimed claim scope affected by presentation of specific claim language during prosecution of this and any related applications. Applicant reserves the right to file broader claims, narrower claims, or claims of different scope or subject matter, in one or more continuation or divisional applications in accordance within the full breadth of the present disclosure, and the full range of doctrine of equivalents of the present disclosure, as recited in this specification.

What is claimed is:

1. A communications system, comprising:
a device configured to simultaneously communicate using a plurality of wireless communication protocols, in which each wireless communication protocol of the plurality of wireless communication protocols has a different physical layer address and a same upper layer address, wherein the device comprises a preferred list of protocols for communicating with an apparatus, and a wireless communication protocol of the plurality of wireless communication protocols is selected based on the preferred list; and
a wireless network connected to the device via the plurality of wireless communication protocols, in which the device simultaneously communicates using at least two wireless communication protocols from the plurality of wireless communication protocol,
wherein the device is further configured to disable a wireless communication protocol with a power usage that is greater than a threshold when a battery level of the device is less than a dynamic threshold configured by an application of the device.

2. The system of claim 1, in which the plurality of wireless communication protocols comprises a long-range wireless communication protocol and a close-range wireless communication protocol.

3. The system of claim 2, in which the long-range wireless communication protocol comprises WiFi and the close-range wireless communication protocol comprises ZigBee or Bluetooth.

4. The system of claim 1, in which the device is directly coupled to the wireless network.

5. The system of claim 1, in which the device is configured to communicate with a first apparatus with a first wireless communication protocol and a second apparatus with a second wireless communication protocol.

6. The system of claim 1, in which the device is configured to communicate with a first apparatus with a first wireless communication protocol and also configured to communicate with the first apparatus with at least a second wireless communication protocol.

7. The system of claim 1, in which the device selects the at least two wireless communication protocols based on at least a power requirement, a data rate requirement, a signal strength, or a combination thereof.

8. The system of claim 1, in which the device dynamically selects between either of the at least two wireless communication protocols.

9. The system of claim 1, in which the device is further configured to broadcast a list of supported wireless communication protocols so that an apparatus can select one of the supported wireless communication protocols for communications with the device.

10. A method to communicate over wireless communication protocols, comprising:
receiving data concurrently, at a device, on at least two wireless communication protocols of a plurality of wireless communication protocols, in which each wireless communication protocol of the plurality of wireless communication protocols has a different physical layer address and a same upper layer address, wherein the device comprises a preferred list of protocols for communicating with an apparatus, and a wireless communication protocol of the plurality of wireless communication protocols is selected based on the preferred list;
performing actions based on the concurrently received data;
transmitting data concurrently, from the device, to a wireless network via the at least two wireless communication protocols; and
disabling a wireless communication protocol with a power usage that is greater than a threshold when a battery level is less than a dynamic threshold.

11. The method of claim 10, in which the at least two wireless communication protocols comprise a long-range wireless communication protocol and a close-range wireless communication protocol.

12. The method of claim 11, in which the long-range wireless communication protocol comprises WiFi and the close-range wireless communication protocol comprises ZigBee and Bluetooth.

13. The method of claim 10, further comprising communicating with a first apparatus via a first wireless communication protocol and communicating with a second apparatus via a second wireless communication protocol.

14. The method of claim 10, further comprising communicating with an apparatus on a first wireless communication protocol and a second wireless communication protocol.

15. The method of claim 10, further comprising selecting the at least two wireless communication protocols based at least on a power requirement, a data rate requirement, a signal strength, or a combination thereof.

16. The method of claim 10, further comprising dynamically selecting between either of the at least two wireless communication protocols.

17. The method of claim 10, further comprising broadcasting a list of supported wireless communication protocols so that a device can select one of the supported wireless communication protocols for communications.

18. A communications system, comprising:
a device configured to simultaneously communicate using a plurality of wireless communication protocols, which each wireless communication protocol of the plurality of wireless communication protocols has a different physical layer address and a same upper layer address, and wherein the device is further configured to broadcast a list of supported wireless communication protocols so that an apparatus can select one of the supported wireless communication protocols for communications with the device; and a wireless network connected to the device via the plurality of wireless communication protocols, in which the device simultaneously communicates using at least two wireless communication protocols from the plurality of wireless communication protocols, wherein the device is further configured to disable a wireless communication protocol with a power usage that is greater than a threshold when a battery level of the device is less than a dynamic threshold configured by an application of the device.

* * * * *